(12) United States Patent
Badeau et al.

(10) Patent No.: US 6,264,371 B1
(45) Date of Patent: Jul. 24, 2001

(54) FIBRE-OPTIC CONNECTOR

(75) Inventors: Jean-Max Badeau, Montfort le Genois; Pierre-Yves Le Guen, Le Mans, both of (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/321,936

(22) Filed: May 28, 1999

(30) Foreign Application Priority Data

Jun. 2, 1998 (FR) .................................................. 98 06914

(51) Int. Cl.[7] .................................................. G02B 6/38
(52) U.S. Cl. .................................. 385/55; 385/70; 385/71; 385/72
(58) Field of Search .................................. 385/60, 66, 68, 385/70, 72, 55, 71

(56) References Cited

U.S. PATENT DOCUMENTS

| 4,190,316 | * | 2/1980 | Malsby et al. |
|---|---|---|---|
| 4,687,291 | * | 8/1987 | Stape et al. |
| 4,896,939 | | 1/1990 | O'Brien ........................ 350/96.23 |

FOREIGN PATENT DOCUMENTS

| 19525739 | 10/1996 | (DE) . |
|---|---|---|
| 0753772A2 | 1/1997 | (EP) . |

* cited by examiner

*Primary Examiner*—Hung N. Ngo
(74) *Attorney, Agent, or Firm*—Perman & Green, LLP

(57) ABSTRACT

The invention relates to a fiber-optic connector (1) comprising a socket (2) and a plug (4) which are intended to be mated in order to join two optical cables. The connector according to the invention includes at least two sealing members, one of them being an interfacial sealing member (12) put under compression when the plug (4) and the socket (2) are being mated.

10 Claims, 6 Drawing Sheets

FIBRE-OPTIC CONNECTOR

The invention relates to a fibre-optic connector comprising a socket and a plug which are intended to be mated in order to join two optical cables.

Patent Application EP 0,753,772 describes a connector of this type, in which the cable is put into an approximately 90° curve.

It has been observed that the optical contacts produced by this type of connector may deteriorate when the latter are used in environments subject to condensation.

The object of the invention is to alleviate the drawbacks of the prior art by means of a compact, sealed connector having a rapid locking system and being suitable for cables of different diameters.

To achieve this objective, the connector according to the invention includes at least two sealing members, one of them being an interfacial sealing member carried by the socket, and put under compression when the plug and the socket are being mated, and the other one being carried by the optical contacts in the plug.

Preferably, the said sealing members consist of two types of seal, one carried by the socket and the other by the optical contacts in the plug.

According to another characteristic of the connector according to the invention, a single catch for fastening the plug onto the socket is provided. This catch is preferably located towards the rear of the socket. The use of a single catch makes it possible for the locking of the connector to be considerably simplified while ensuring uniform compression of the interfacial sealing member.

Other characteristics and advantages of the invention will emerge from the description which follows, given by way of non-limiting example, and with reference to the appended figures in which.

Figure 1:
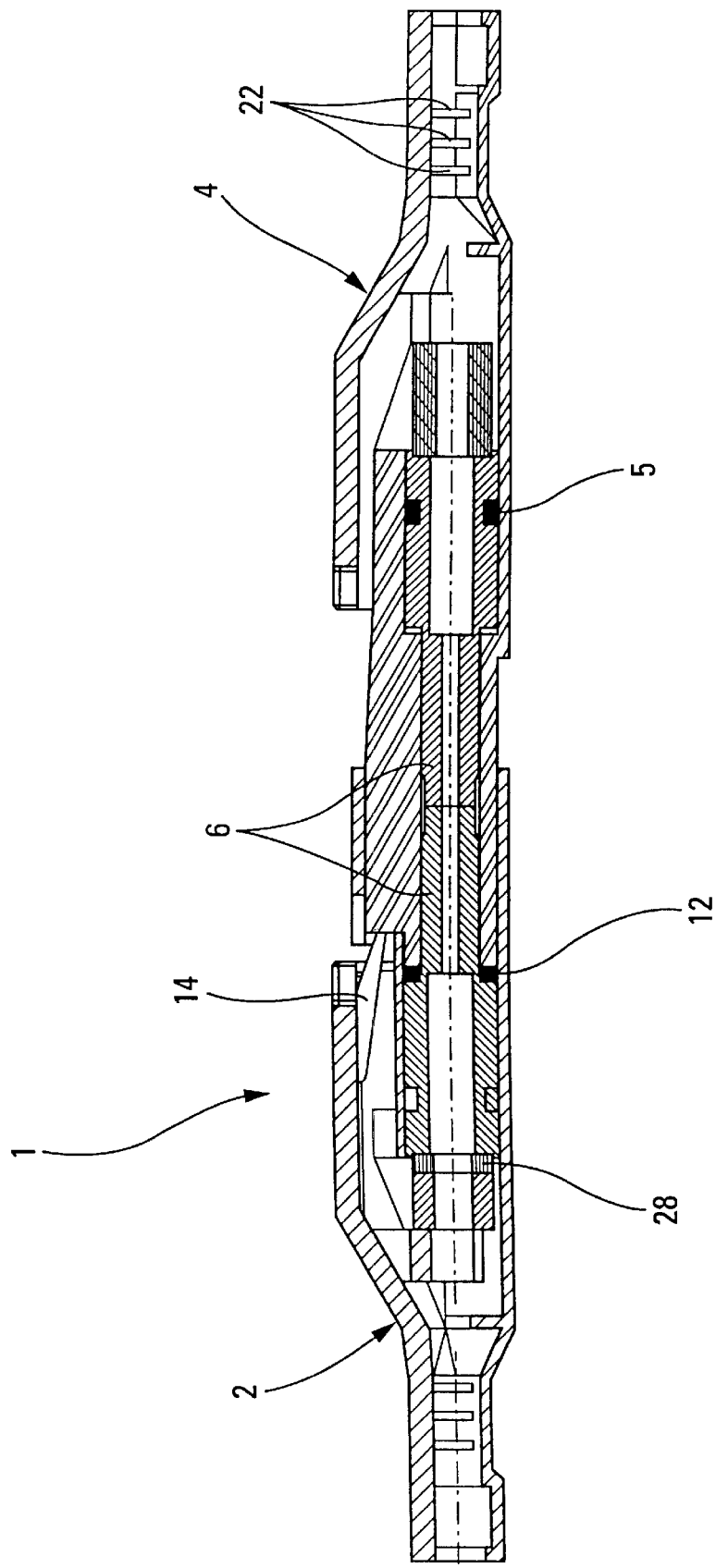
FIGS. 1 and 2 show diagrammatically a view, in vertical section, of a connector according to the invention.
Figure 2:
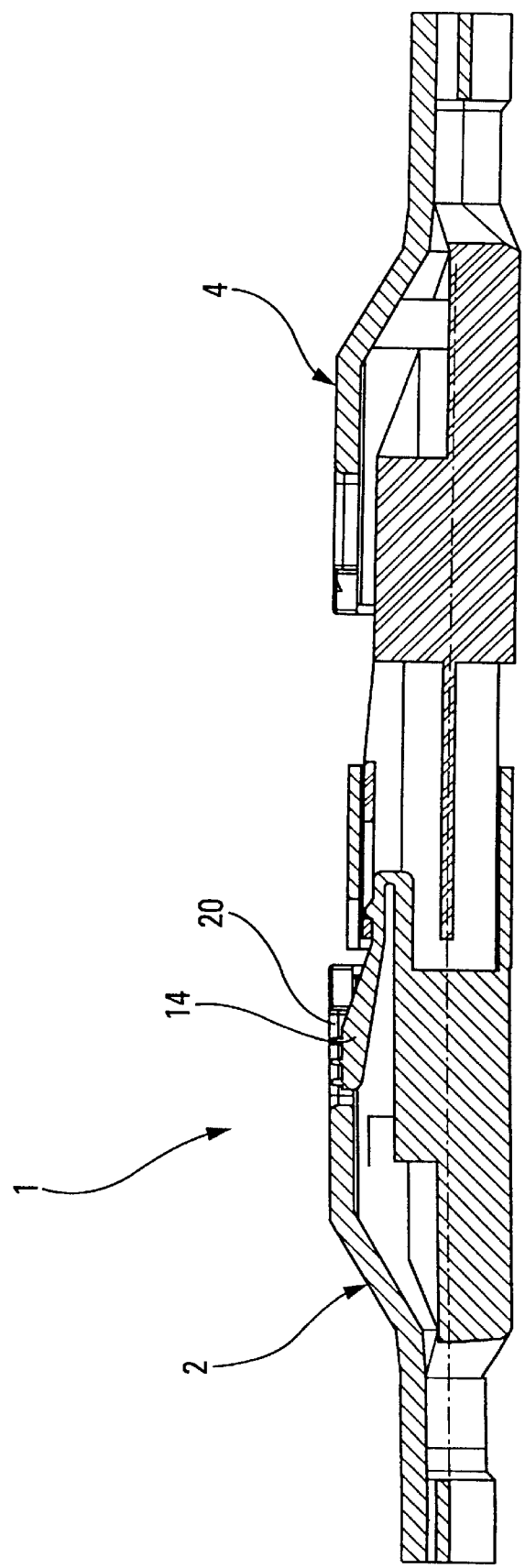

FIGS. 1 and 2 show a fibre-optic connector 1 comprising a socket 2 and a plug 4 which are intended to be mated in order to join two optical cables (not shown).

As may be seen in FIG. 1, the connector includes two sealing members, one of them being an interfacial sealing member 12 carried by the socket, and put under compression when the plug 4 and the socket 2 are being mated, and the other one, 5, being carried by the optical contacts in the plug.

According to a preferred embodiment of the invention, the said sealing members 12 and 5 consist of two types of seal, one carried by the socket 2 and the other by the optical contacts in the plug 4. Preferably, the seal 5 is an O-ring seal 5 placed around each optical contact 6 so as to ensure that the connector 1 is sealed on the plug 4 side.

Figure 6:
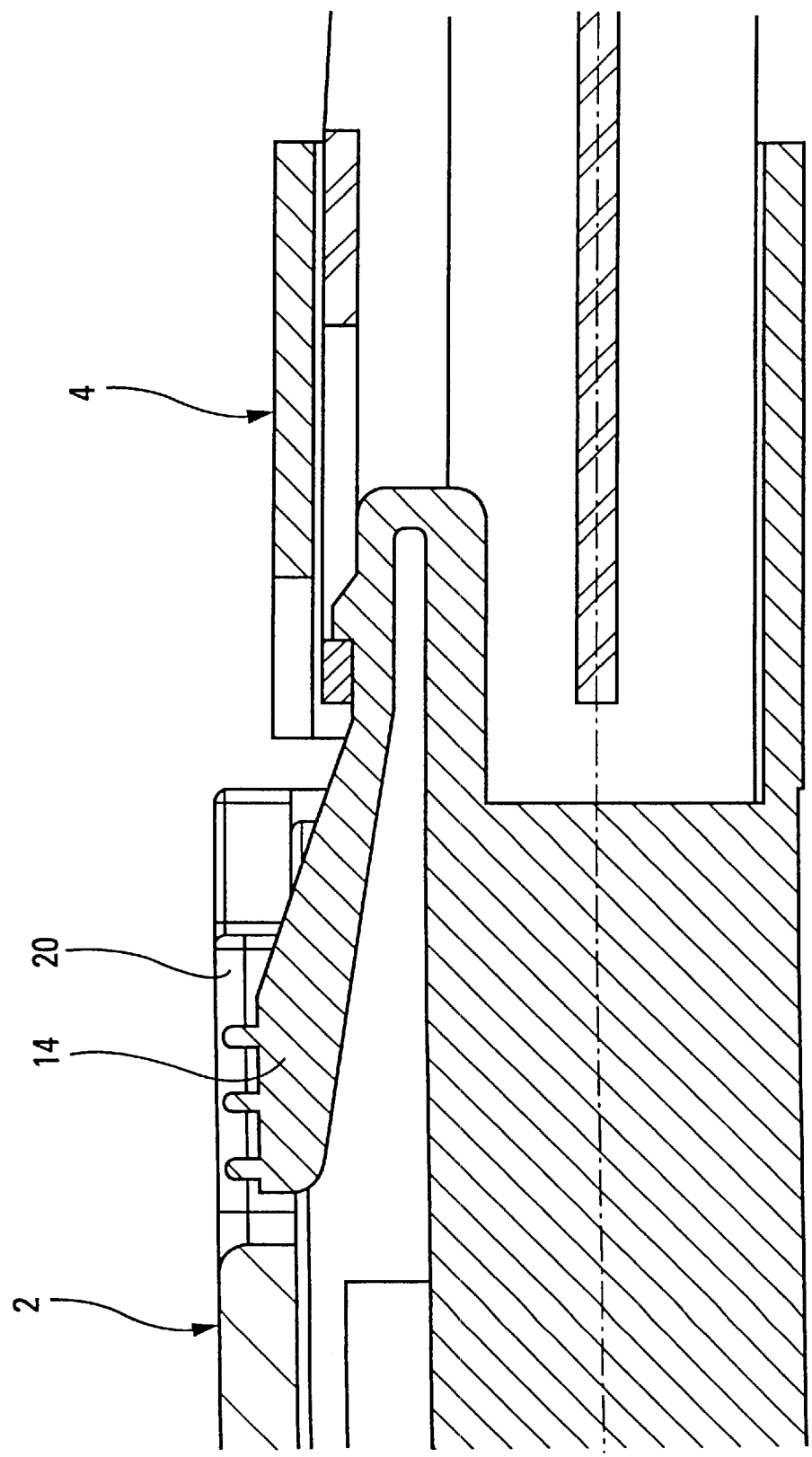
FIG. 6 shows diagrammatically and partially, in vertical section, an enlarged view of the locking system of the connector in FIG. 1.

As may be seen in FIGS. 2 and 6, a single catch 14 for fastening the plug 4 is located towards the rear of the socket 2. This catch 14 is intended to be lodged in a recess 20 located on the nose 18 of the plug 4 when the latter is being mated with the socket 2. The nose 18 is intended to be inserted into a guidance region 16 lying at one of the ends of the said socket 2. The arrangement of the catch 14 ensures long guidance of the said nose 18 in the guidance region 16. This long guidance makes it possible for the interfacial seal to be uniformly compressed, this being so contrary to all expectations despite the use of just one catch 14 which ought a priori to cause imbalance in the compression system. This interfacial sealing system seals the rear on the socket 2 side.

Figure 3:
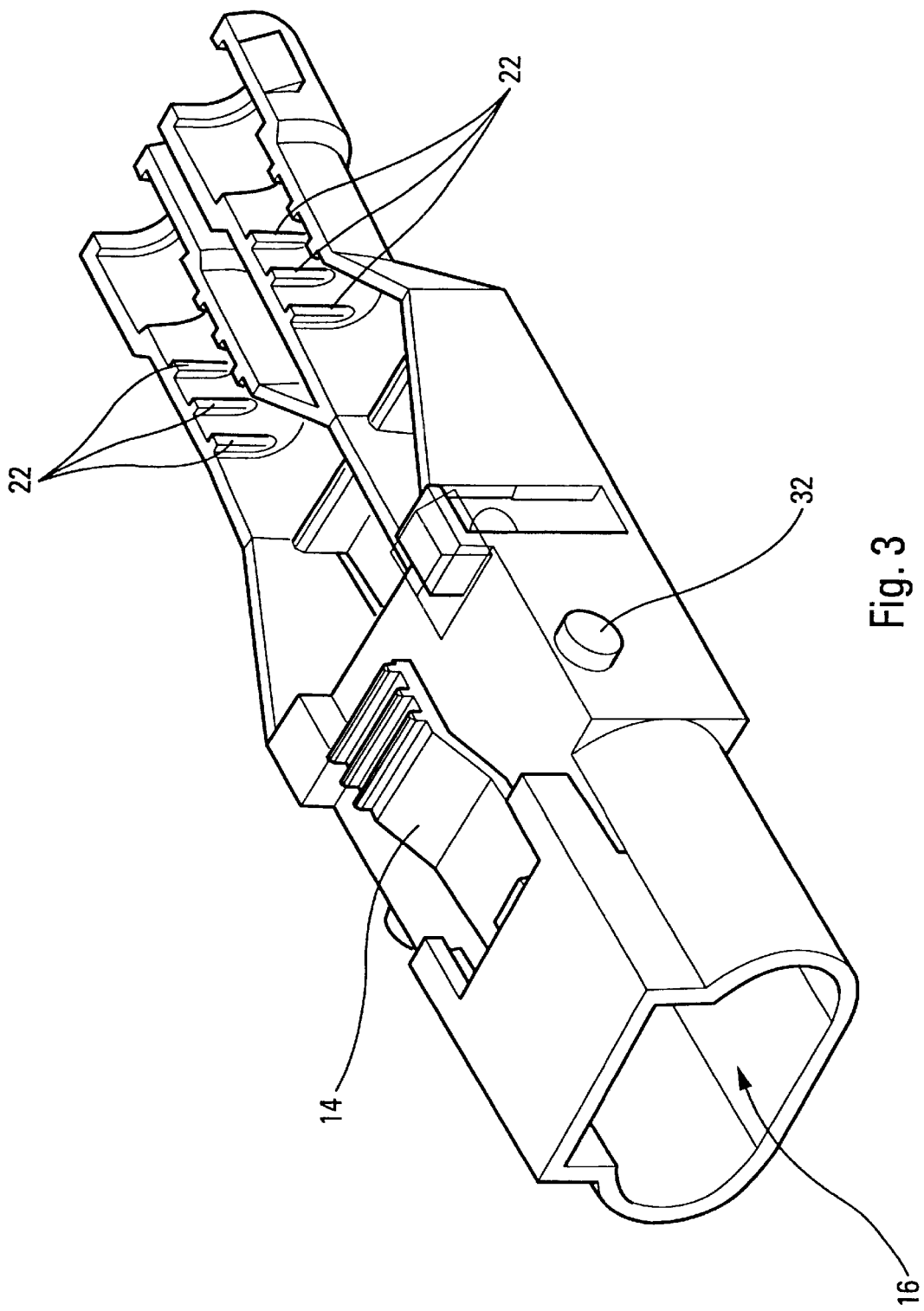
FIG. 3 shows diagrammatically a socket forming part of the connector in FIG. 1.
Figure 4:
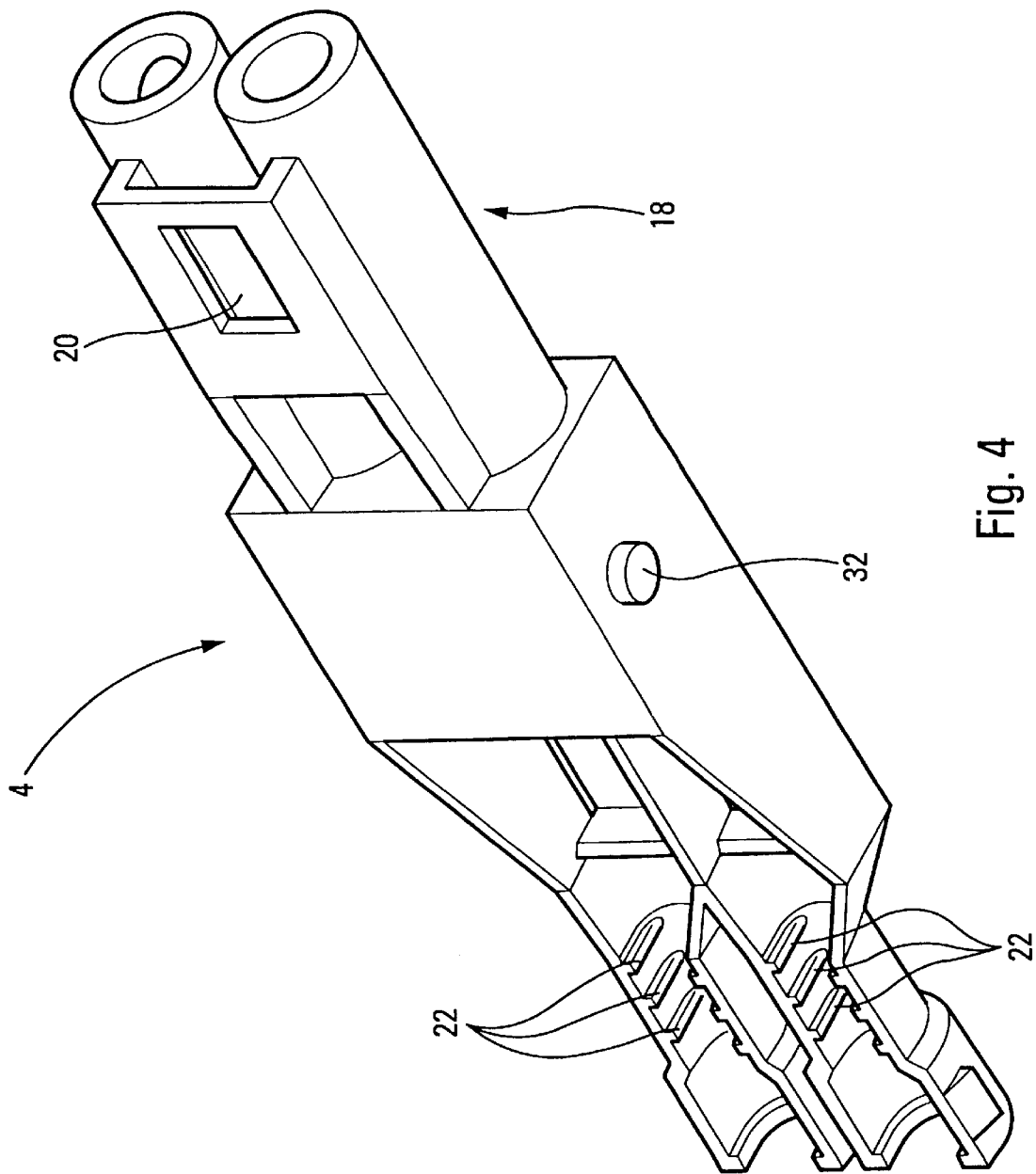
FIG. 4 shows diagrammatically a plug forming part of the connector in FIG. 1.

As may be seen in FIGS. 3 and 4, the socket 2 and the plug 4 each have means 22 for retaining the optical cable. Each retaining means 22 is preceded by a boss intended to ensure that the optical cable is put into a curve when the optical contacts move back during the phase of mating the plug 4 with the socket 2.

Figure 5:
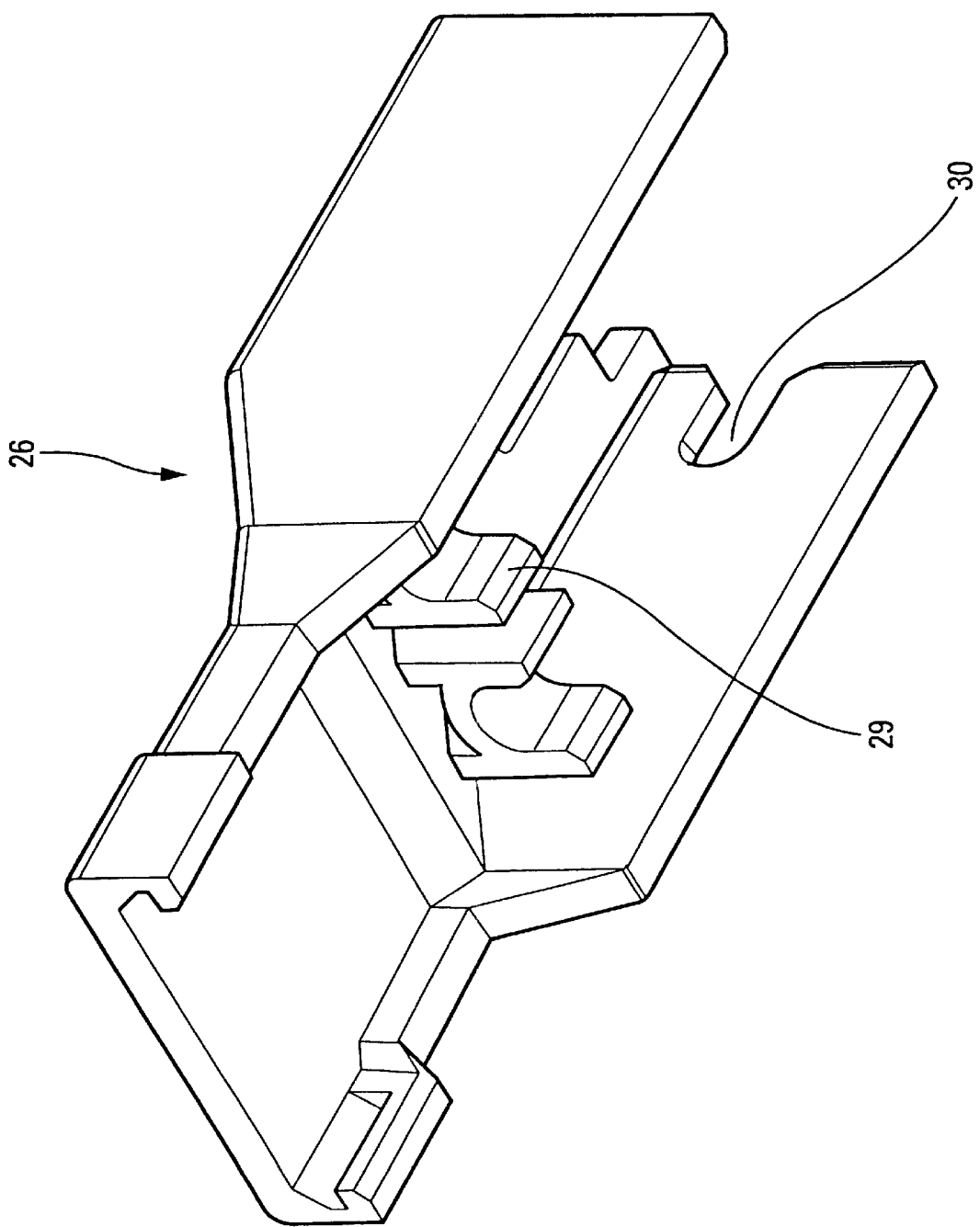
FIG. 5 shows diagrammatically a cover intended to fit onto the socket in FIG. 3 and the plug in FIG. 4, respectively.

Furthermore, the socket 2 and the plug 4 each have a snap-on pivoting cover 26, shown in FIG. 5, on which retaining means 29 are placed, these retaining means being designed to grip systems 28 for holding the optical contacts 6 in place and for putting them under compression. The said holding and compressing systems 28 consist of silicone cylinders (see FIG. 1) which are provided, on the one hand, in the socket and, on the other hand, in the plug and which, by means of the pivoting cover, ensure that the optical contacts are put under compression during mating.

In order for the cover 26 to be able to pivot, the latter has, on each side, a notch 30 in which a pivot 32, located on each side of the socket 2 and on each side of the plug 4, is lodged.

What is claimed is:

1. Fibre-optic connector comprising a socket and a plug having a nose which are intended to be mated in order to join two optical cables wherein said connector includes at least two sealing members, one of them being an interfacial sealing member, carried by said socket and put under compression when the plug and the socket are being mated, and the other one, being carried by optical contacts in said plug, said sealing member being pushed with a force parallel to the connection axis of said connector by an end of said nose, said sealing member being disposed between said plug and said socket.

2. A connector according to claim 1, wherein said sealing members consist of two types of seals, one carried by said socket and the other by said optical contacts in said plug.

3. A connector according to claim 2, wherein said socket has a single catch for fastening said plug onto said socket.

4. A connector according to claim 3, wherein said socket includes a region for guiding said plug into said socket.

5. A connector according to claim 4, wherein said plug has said nose is provided with a recess intended to accommodate said fastening catch, said nose being intended to be inserted into the said guidance region when said plug and said socket are being mated.

6. A connector according to claim 1, wherein said socket and said plug each have means for retaining said optical cable.

7. A connector according to claim 6, wherein said socket and said plug each have, in addition, a snap-on pivoting cover on which retaining means are placed, these retaining means being designed to grip systems for holding said optical contacts in place and for putting them under compression, these optical contacts being present in said socket and in said plug.

8. A connector according to claim 7, wherein said means for holding said optical contacts in place and for putting them under compression consist of silicon cylinders.

9. A connector according to claim 1, wherein there is included on the plug side, an O-ring seal placed around each optical contact, the O-ring seal being intended to ensure that the connector is sealed on the plug side.

10. A connector according to claim 6 wherein each retaining means is preceded by a boss intended to ensure that said optical cable is put into a curve when the optical contacts move back during the phase of mating said plug with said socket.

* * * * *